United States Patent [19]
Tsuruoka et al.

[11] Patent Number: 4,617,598
[45] Date of Patent: Oct. 14, 1986

[54] ROTARY HEAD MAGNETIC RECORDER/REPRODUCER

[75] Inventors: Keiichirou Tsuruoka; Ryo Minohara, both of Hirakata, Japan

[73] Assignee: Matsushita Electric Industrial Co., Ltd., Kadoma, Japan

[21] Appl. No.: 588,864

[22] PCT Filed: May 25, 1983

[86] PCT No.: PCT/JP83/00160
§ 371 Date: Jan. 25, 1984
§ 102(e) Date: Jan. 25, 1984

[87] PCT Pub. No.: WO83/04360
PCT Pub. Date: Dec. 8, 1983

[30] Foreign Application Priority Data
May 25, 1983 [JP] Japan .................................. 57/89026

[51] Int. Cl.$^4$ ........................................... H04N 5/782
[52] U.S. Cl. .................................................. 360/10.3
[58] Field of Search .......................... 360/10.3, 64, 70; 358/312, 315, 328

[56] References Cited
U.S. PATENT DOCUMENTS
4,280,146 12/1978 Misaki et al. .
4,531,162 7/1985 Tokumitsu .......................... 360/10.3

FOREIGN PATENT DOCUMENTS
46-36367 10/1971 Japan .
49-44528 11/1974 Japan .
51-43698 10/1976 Japan .
52-5541 2/1977 Japan .
56-32886 2/1981 Japan .
56-42476 4/1981 Japan .................................. 360/10.3

Primary Examiner—Donald McElheny, Jr.
Attorney, Agent, or Firm—Wenderoth, Lind & Ponack

[57] ABSTRACT

A helical scanning rotary head type magnetic video recording and reproducing apparatus for recording and reproducing a video signal by two rotary heads having head gap angles which are slightly different from each other and carry out azimuth recording, and for reproducing a still image by two rotary heads having a same head gap angle as that of one of said two rotary heads. When the apparatus is switched from a normal playback mode to a still image playback mode, a magnetic tape is driven at a lower speed than that used during recording and a noise generation section within reproduced signals is detected, and the magnetic tape is stopped after it is allowed to run for a predetermined length of the tape so as to stop the tape at an optimum condition for reproducing a still picture.

7 Claims, 28 Drawing Figures

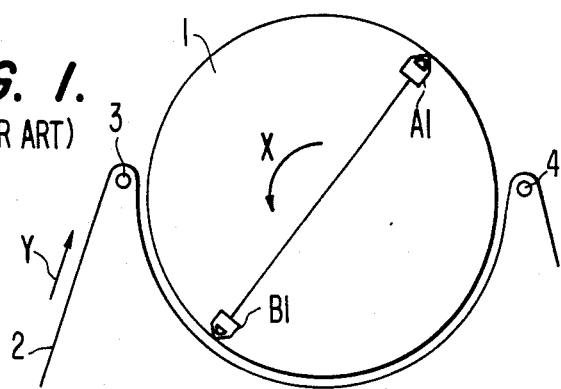
FIG. 1.
(PRIOR ART)
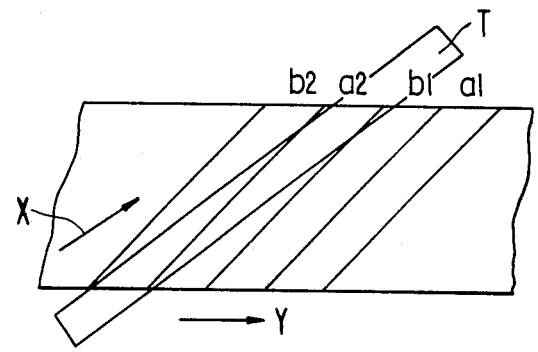
FIG. 2.
(PRIOR ART)
FIG. 3(A).
(PRIOR ART)
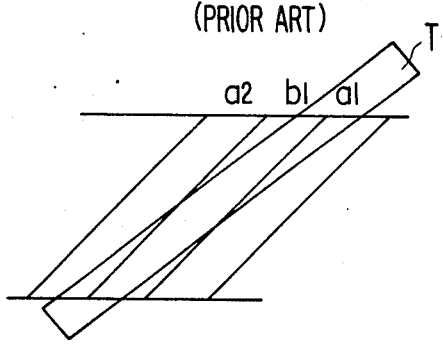
FIG. 3(B).
(PRIOR ART)
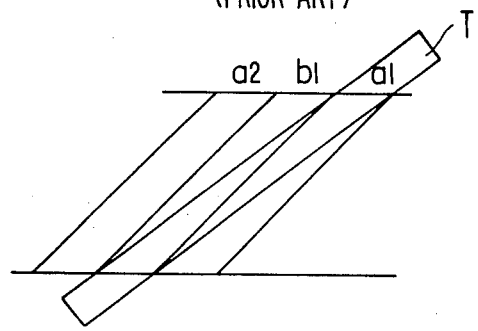
FIG. 3(C).
(PRIOR ART)
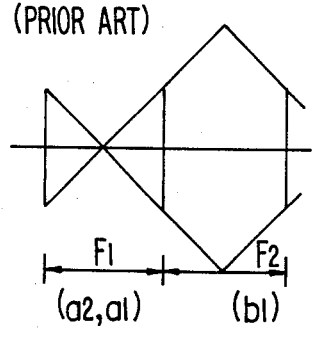
FIG. 3(D).
(PRIOR ART)
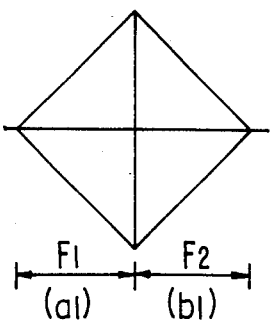

ROTARY HEAD MAGNETIC RECORDER/REPRODUCER

BACKGROUND OF THE INVENTION

1. Field of the Invention

The present invention relates to a helical scan type (VTR) magnetic recording and reproducing apparatus constructed to enable high quality playback of a still image.

2. Description of the Prior Art

As is well known, a helical scan type VTR records and reproduces each field or frame of video signal sequentially by two rotary heads following a record locus which is oblique to the length of a magnetic tape. It is constructed to record a vertical blanking signal at an end of each record locus such that a transition point from one record track to the next track, that is a switching point of the rotary heads, lies near the vertical blanking signal.

When the magnetic tape is stopped, a still image can be reproduced. However, the scanning locus of the rotary head on the magnetic tape when the magnetic tape is stopped does not coincide with the record locus. Accordingly, the rotary head cannot exactly scan the record locus, and there exists a time period when no play back signal is reproduced.

If this zero-playback signal period lies near the vertical blanking signal, an image including a substantially small defect can be displayed on the television receiver. Accordingly, prior art apparatus has stopped the movement of the magnetic tape slowly during the time that the zero-playback signal period lies near the vertical blanking signal, when a still image is to be reproduced, as shown in the U.S. Pat. No. 4,280,146 to Misaki et al.

This situation is explained in detail in FIGS. 1, 2 and 3(A)-3(D). In FIG. 1, element 1 is a rotary driven head cylinder which rotates in the direction of the arrow; two magnetic heads, $A_1$, and $B_1$, having the head gaps which are inclined at angles which differ by a few degrees are fitted on the head cylinder 1.

A magnetic tape 2 moves in the direction of the arrow Y, and is wound helically around a 180° circumference, and is guided by the guide parts 3 and 4 along the circumference of the head cylinder 1.

FIG. 2 shows a typical recording pattern on the magnetic tape 2.

The recording locus $a_1, a_2 \ldots$ and the recording locus $b_1, b_2 \ldots$ are azimuth recorded by the rotary head $A_1$ and the rotary head $B_1$ respectively.

FIGS. 3(A)-3(B), show typical respective scanning loci T for the rotary magnetic heads A and B during the playback of the still image.

Since the rotary magnetic heads $A_1$ and $B_1$ reproduce only their own recording locus, $a_1, a_2 \ldots$ and $b_1, b_2 \ldots$ respectively, during the playback, the playback signal of FIG. 3(A), as shown in FIG. 3(C), shows the playback signal of the magnetic head $A_1$ from the recording locus $a_1$ and $a_2$ during the first field duration $F_1$, and during the subsequent field duration $B_2$, the playback signal from the recording locus $b_1$ of the magnetic head $B_1$ is shown.

As clearly seen in FIG. 3(C), in the middle of the field duration $F_1$, during the transfer of the recording locus from $a_2$ to $a_1$, the play back signal is not obtained sufficiently, resulting in a deterioration of the still image.

Whereas, the playback signal of the configuration of FIG. 3(B), as shown in FIG. 3(D), shows the playback signal from the recording locus $a_1$ during the first field duration $F_1$ by the magnetic head $A_1$, and during the subsequent field duration $F_2$, the playback signal from the recording locus $b_1$ of the magnetic head $B_1$ is shown.

Since the duration of the minimum level of the playback signal exists in the beginning or at the end portion in each field (adjacent portion of the vertical blanking duration of the playback signal), a better still image is obtainable in contrast to the case in FIG. 3(C).

However, this still picture is not sufficient.

There are two defects.

One defect is that the still picture contains noisy portions at the beginning and end of the playback image.

Another defect is that this still picture moves slightly due to the fact that the still picture is composed of two field pictures of record locus $(a_1, b_1)$ reproduced by two heads $(A_1, B_1)$ respectively. This reproducing of this still picture is called a reproducing of a "Frame Still Picture".

SUMMARY OF THE INVENTION

It is an object of the present invention to provide a magnetic video recording and reproducing apparatus which can automatically provide a sufficient still image without noisy portions or without slight picture movement.

These and other objects, features and advantages of the invention will appear more fully from the following description and claims taken in connection with the accompanying drawing, forming a part of this application.

The object may be achieved by providing a rotary head type magnetic recording and reproducing apparatus for recording and reproducing a video signal sequentially on a magnetic tape driven by a capstan by alternately using two rotary heads provided on a rotating body, said two heads having head gap angles which are slightly different from each other and which carry out azimuth recording such that each field of a frequency modulated video signal is reproduced by following a record locus which is oblique to the length of the magnetic tape, said apparatus comprising:

(a) a means for driving said magnetic tape at a speed which is lower than the tape speed used in a recording mode when said apparatus is reproducing still pictures;

(b) at least one additional rotary magnetic head for reproducing still pictures, provided on said rotating body, and having a head gap angle which is the same as that of one of said two rotary magnetic heads, said apparatus reproducing one recording track repeatedly by using two of said rotary magnetic heads having a same head gap angle when said magnetic tape is moving slowly and stopped;

(c) a means for detecting a noise generation section within reproduced signals of at least one magnetic head;

(d) a means for comparing the phase difference between the signal of said means for detecting and a pulse signal synchronized with the rotational phase of said rotating body when an output of said means for detecting occurs within a predetermined rotational phase position of said rotating body;

(e) a means for stopping the travel of said magnetic tape after driving a specified length of said magnetic tape responding to the output of said means for comparing when said tape is moving slowly by said means for driving.

BRIEF DESCRIPTION OF THE DRAWINGS

FIG. 1 shows the plan of the principle part of rotary head magnetic recording and playback unit of a conventional helical scanning VTR.

FIG. 2 shows a typical recording pattern on the magnetic tape of the rotary head magnetic recording and playback unit.

FIGS. 3(A) and 3(B) show the relationship between scanning loci and respective recording loci of the rotary magnetic head during respective still image playback.

FIGS. 3(C) and 3(D) show the playback signal level of the still image playback of FIG. 3(A) and 3(B).

FIGS. 5(A)–8(A) show the relationship between the recording locus and the playback locus; FIGS. 5(B)–8(D) show the envelope of the playback head output; FIGS. 5(C)–8(C) show the noise field; FIGS. 5(D)–8(D) show the playback output of the other magnetic head.

DESCRIPTION OF THE PREFERRED EMBODIMENT

Figure 4A:
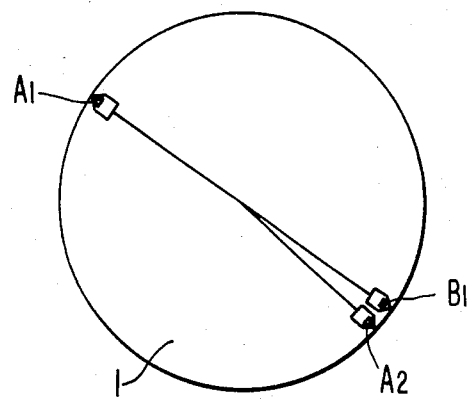
FIGS. 4(A) and 4(B) show an arrangement of the magnetic head on the head cylinder of a rotary head magnetic recording and playback unit in accordance with the present invention.

FIG. 4(A) shows an arrangement of the magnetic head on the rotary cylinder 1 an embodiment of the present invention, wherein $A_1$ and $B_1$ are the magnetic heads for recording and normal playback having head gaps inclined in different directions and a head width of 30 $\mu$m. Furthermore, $A_2$ is installed adjacent to the magnetic head $B_2$ and comprises a third magnetic head for the reproducing a still image and having its head gap inclined at the same angle as that of magnetic head $A_1$. The width of the head $A_2$ is 30 $\mu$m.

On recording, a track will be recorded as usual as the recording locus a1, b1, a.e . . . of 19 $\mu$m width successively and partially overlapped the previously recorded recording locus.

Furthermore, magnetic heads $A_1$ and $B_1$ are used for the usual playback.

The magnetic heads $A_1$ and $A_2$ will be used when a still image is playback.

FIGS. 5(A)–8(A) show the relationship between the scanning locus T versus the recording locus on the magnetic tape of the magnetic heads $A_1$ and $A_2$ when the magnetic tape has been moved a small distance successively. FIGS. 5(B)–8(B) show the envelope of the playback signal and FIGS. 5(C)–8(C) show the detecting pulse corresponds to the duration of the playback signal level which drops as low as the prescribed level. FIGS. 5(D)–8(D) show the playback signal envelop during contact between the magnetic head $B_1$ and the magnetic tape.

Figure 5A:
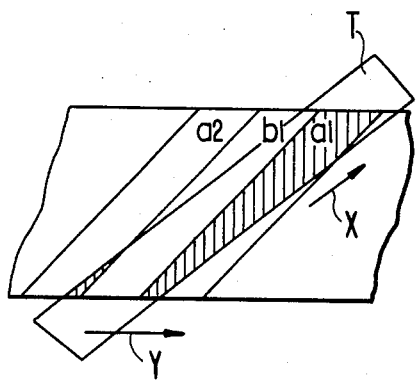
FIGS. 5(A)–5(D), 6(A)–6(D), 7(A)–7(D), and 8(A)–8(D) show the playback conditions of the still image in accordance with the present invention whereby
Figure 5B:
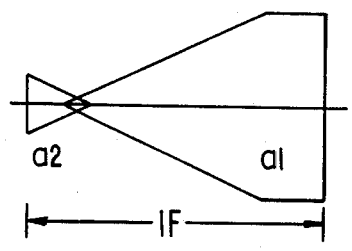
Figure 6B:
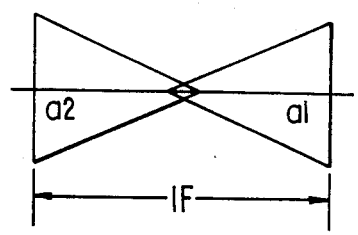
Figure 5C:
Figure 6C:
Figure 5D:
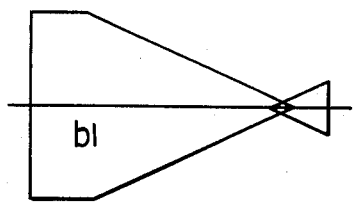
Figure 6D:
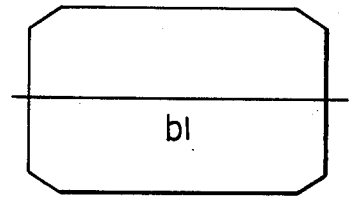
Figure 8A:
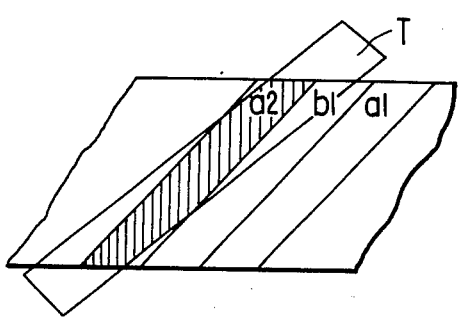
Figure 8B:
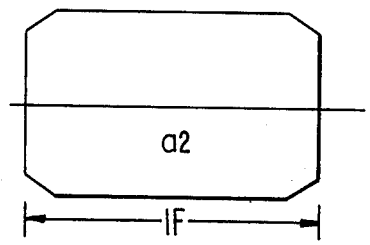

During still image playback, since the magnetic heads $A_1$ and $A_2$ are in use, the playback recording locus is $a_1$ and $a_2$ respectively as shown in 5, the magnetic heads $A_1$ and $A_2$ transfer recording tracks from $a_2$ to $a_1$ at the initial stage of the 1 field; the output level drops at this point, as shown in FIG. 5(B).

Similarly, as shown in FIGS. 6 and 7, a drop in the output level occurs in the middle and adjacent part at the end of the 1 field. Thus, a good still image is not obtained.

However, as shown in FIG. 8, the magnetic heads $A_1$ and $A_2$ only reproduce the recording locus $a_1$, moreover, a sufficient playback signal level is obtained at the beginning and end portions of the field.

Accordingly, the optimum still image is obtainable when the magnetic tape is stopped at the situation in FIG. 8.

Further, FIG. 4(A) shows an embodiment for the still image playback of one of the magnetic head $A_1$ for recording and normal playback as well as the third magnetic head $A_2$ for the still image playback.

Figure 4B:
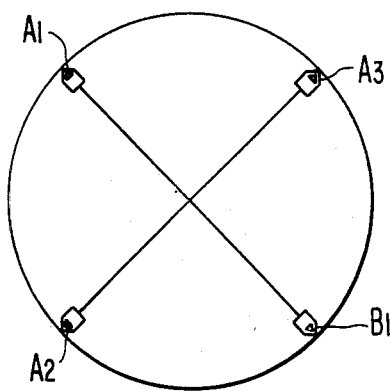
Figure 6A:
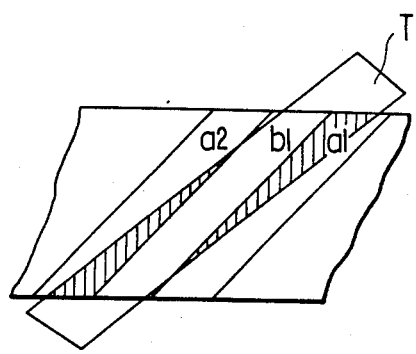

As shown in FIG. 4(B) when using the magnetic heads $A_2$ and $A_3$ installed exclusively for the still image, and having inclinations of their head gaps which are similar to that of magnetic head $A_1$, the same situation may be expected.

Next, an explanation will be given to the method of stopping the magnetic tape automatically as shown in FIG. 8.

When starting the magnetic tape slowly during playback, the scanning loci of the magnetic heads $A_1$ and $A_2$ moves successively and regularly in order of FIG. 5→FIG. 6→FIG. 7→FIG. 8→FIG. 5.

Figure 7A:
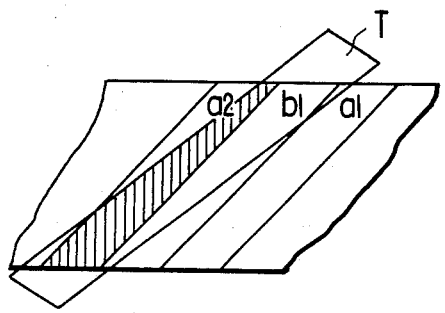
Figure 7B:
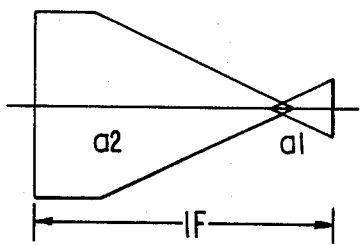
Figure 7C:
Figure 8C:
Figure 7D:
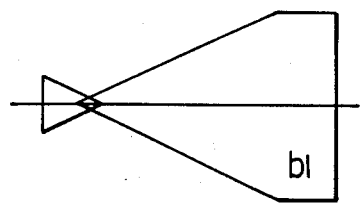
Figure 8D:
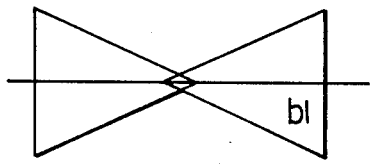

Complying with this movement, the duration of the drop in the playback signal level moves successively towards the right direction as shown in FIG. 7(C).

Accordingly, by detecting the time when the duration of the playback signal level drops location for instance, at the center (in the middle of a field duration), of the picture as shown in FIG. 6, and stopping the magnetic tape after having moved by one track pitch (19 $\mu$m) from a point of the detection, then the still image can be obtained as shown in FIG. 8. Similarly, as shown in FIG. 7, if the detecting point where the duration of the playback signal drop location, is at one quarter of the picture, the optimum still image may be obtained as shown in FIG. 8. When the tape has been stopped after having moved by one half track pitch (9.5 $\mu$m).

Figure 9:
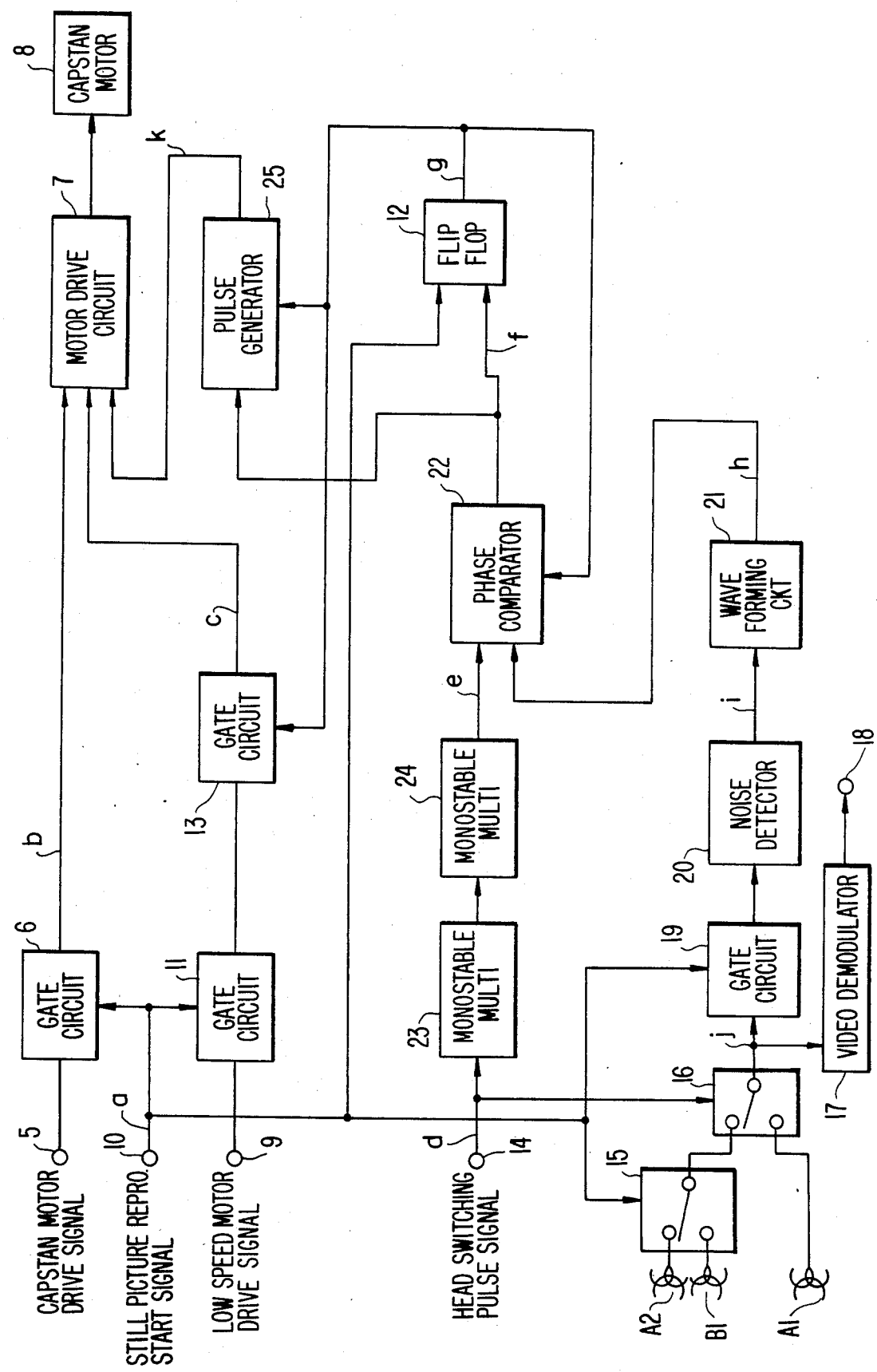
FIG. 9 is block diagram of one embodiment of a rotary head magnetic recording and playback unit in accordance with the present invention.
Figure 10:
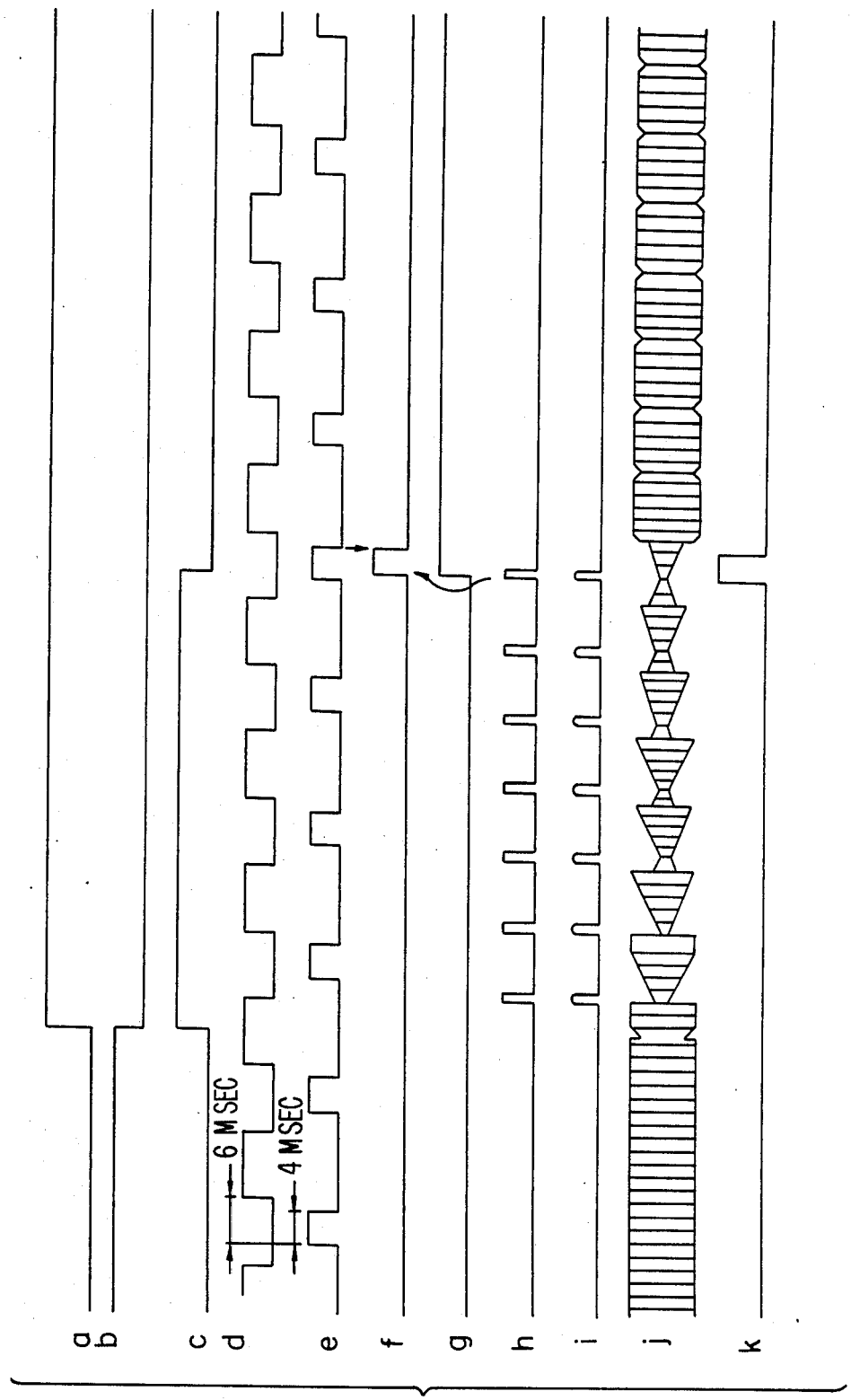
FIGS. 10 (a)–(k) are waveforms of the embodiment of FIG. 9.

FIG. 9 shows the block diagram of an embodiment of the inventor which gives the optimum still image and FIGS. 10 (a)–(k) show timing diagrams thereof.

In FIG. 9, terminal 5 is input terminal of the drive signal for the capstan motor during recording and normal playback mode. This drive signal for the capstan motor is during recording and normal playback mode, input to the motor drive circuit 7 as signal b via the first gate circuit b which is in a conductive state, and drives the capstan motor at a prescribed speed.

The reference numeral 9 denotes an input terminal for a motor low speed drive signal for effecting a low-speed rotation of the capstan motor 8, said input terminal being connected to a second gate circuit 11. Indicated at 10 is an input terminal to which a still picture reproduction start signal a of a High level is delivered before the start of still picture reproduction, and as said still picture reproduction start signal a is inputted, said first gate circuit 6 is blocked, i.e.—inhibited or open circuited, and the second gate circuit 11 which was previously in a blocked state is rendered conductive.

Therefore, as the still picture reproduction starts signal a is inputted, said motor low-speed drive signal is inputted as a signal c to the motor drive circuit 7 through said second gate circuit 11 and a third gate circuit 13 which is blocked by the output of a flip-flop circuit 12, whereby the magnetic tape is switched to a low speed mode. The reference numeral 14 represents an input terminal for the known head switching pulse d which is in phase with the turning of the revolving drum 1 and effects a serial switching of the reproduction outputs of two magnetic heads during reproduction.

Indicated at 15 is a first switching circuit, whereby the output of magnetic head $A_2$ along is made available at the output thereof during still picture reproduction in response to said still picture reproduction start signal a while normally the output of magnetic head $B_1$ is made available at said output.

The numeral 16 indicates a second switching circuit which effects a serial switching between the output of said first switching circuit 15 and the output of the head $A_1$ in response to said head switching pulse d, and its output j is outputted to an output terminal 18 as a video signal through a video demodulation circuit 17 and, at the same time, fed to a third gate circuit 19. This third gate circuit 19 remains blocked during normal reproduction but is rendered conductive when said still picture reproduction start signal a is applied and its output is fed to a noise discrimination circuit 20.

This noise discrimination circuit 20 generates an output i corresponding to the interval during which the reproduction signal j is below a predetermined level where a satisfactory picture signal is not obtained.

This output i is fed to a shaping circuit 21 and its output signal h is delivered to one of input terminals of a phase comparator circuit 22.

On the other hand, a portion of said head switching pulse d is processed by monostable multivibrators 23 and 24 into a signal e positioned 6 milliseconds ahead of the rising edge of head switching pulse d and having a width of 4 milliseconds and is fed to the other input terminal of said phase comparator circuit 22.

The circuit is so designed that, as shown in FIGS. 10 (a)–(k), the output f of said phase comparator circuit 22 provides a signal whose leading edge coincides in time with the AND output of said signals e and h and whose trailing edge coincides in time with the trailing edge of said signal 3. Thus, the pulsewidth of output f changes according to the position of said signal h in the High interval of signal e. this output f is fed to a pulse generator 25, where it is converted to a signal k having a pulsewidth or voltage corresponding to the pulsewidth of output f, said signal k being then applied to the motor drive circuit 7, whereby the capstan motor 8 is rotated by an amount corresponding to the pulsewidth of said output f to drive the magnetic tape.

In addition, a portion of said output f is fed to the flip-flop 12 and when the output f becomes High, the output g of flip-flop 12 is rendered High and the increased output g blocks the third gate circuit 13 to terminate application of the motor low speed drive signal to the motor drive circuit 7.

This output g is also fed to said pulse generator 25 and phase comparator circuit 22 so as to prevent generation of a further output. The pulsewidth or level of the output k of said pulse generator 25 is changed according to the pulsewidth of output h as mentioned hereinbefore but the conversion value has been predetermined by theoretical simulation or experimentally in accordance with the characteristics of the device.

Thus, the present invention embodiment is so constructed that the position, within the interval determined by signal e, at which the signal h generated during the interval of low reproduction signal level was generated is detected and the amount of subsequent travel of the magnetic tape is controlled according to that position so as to stop the tape in the condition indicated in FIG. 8.

In the above embodiment, the noise discrimination circuit 20 detects the moment when the envelope of the FM-modulated reproduction signal becomes smaller than a predetermined value but the present device can also be so constructed that it demodulates the reproduction signal and determines whether the demodulated signal is within a given level range or a given frequency range.

In this arrangement, the demodulation output of a reproduction signal without noise lies within such a given level range or frequency range, whereas the demodulation output of a reproduction signal with noise is above said given level range or outside of said frequency range. In this system, when the head width of the magnetic head during reproduction is sufficiently greater than the width of recording locus, the adjacent recording loci in the same magnetization direction (for example, $a_1$ and $a_2$) are simultaneously reproduced so that the envelope of reproduction signal in this interval may show a large value. Therefore, this arrangement is advantageous in such cases. Moreover, it is also possible to drive the magnetic tape by a given amount by causing a different roller to be abutted against the magnetic tape, instead of driving the capstan motor 8, utilizing the output k of said pulse generator.

Moreover, in the above embodiment, the reproduction signals of the magnetic heads $A_1$ and $A_2$ used during still picture reproduction are utilized for the detection purpose, too, but it is also possible to use the output of a magnetic head (for example $B_1$) which is not used during still picture reproduction.

Since, as shown in FIGS. 5(D) through 8(D), the level depression part of the reproduction signal of magnetic head $B_1$ and the level depression part of the reproduction signals of magnetic heads $A_1$ and $A_2$ are in a given phase relationship to each other, the same desired object can be accomplished by utilizing the output of said magnetic head $B_1$.

Figure 11:
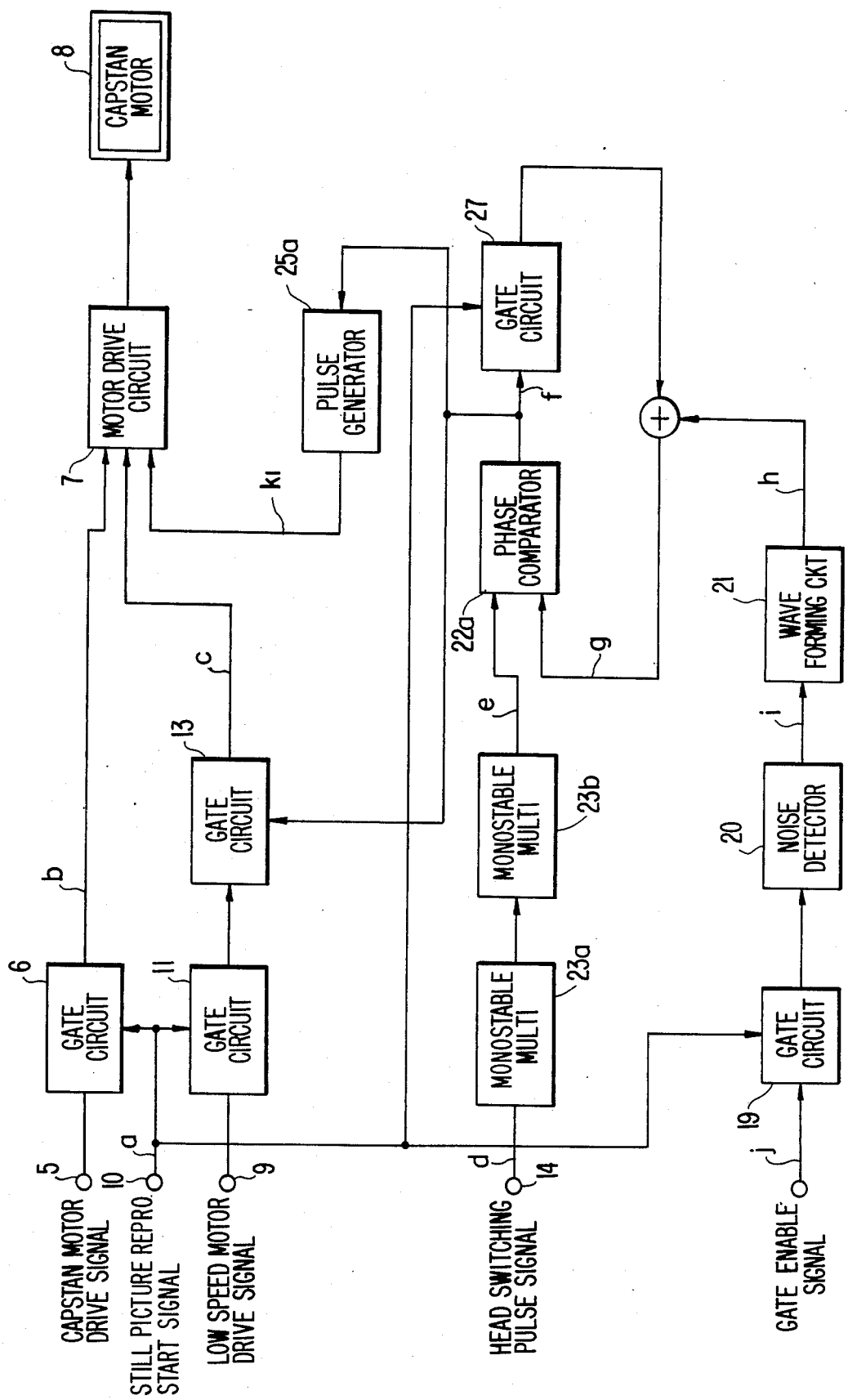
FIG. 11 is a block diagram of another embodiment in accordance with the present invention.
Figure 12:
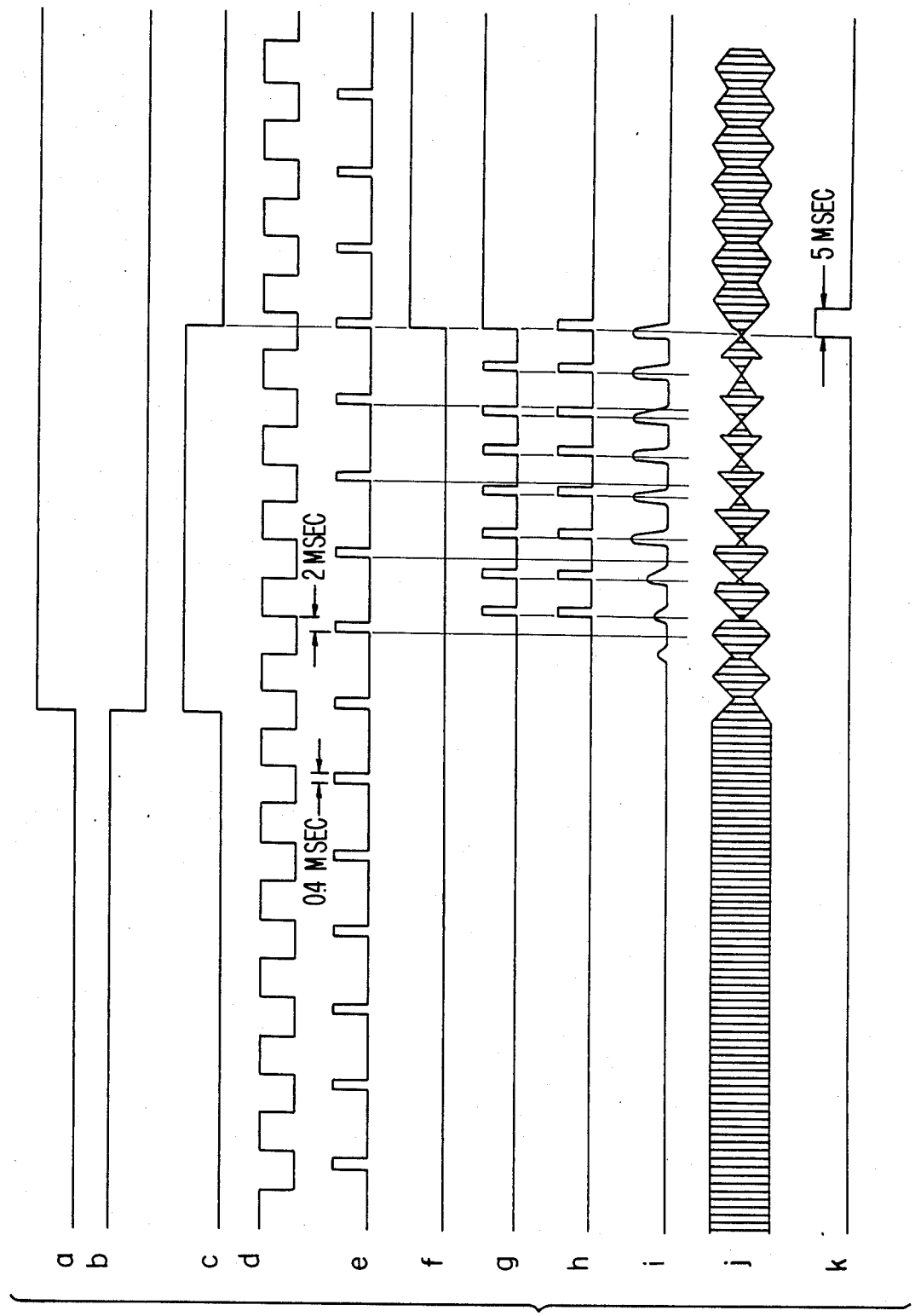
FIG. 12 (a)–(k) are waveforms of the embodiment of FIG. 11.

FIG. 11 is a block diagram of another embodiment of this invention and FIGS. 12 (a)–(k) are timing charts thereof.

In FIG. 11, the component elements which are the same as those of FIG. 9 are represented by the same reference symbols.

This embodiment is such that, as shown in FIGS. 12 (a)–(k), a pulse e having a width of 0.4 milliseconds is prepared from said head switching pulse d at 2 milliseconds prior to the leading edge of the same pulse d and the phase of this pulse e is compared with that of output b of a shaping circuit 21 by a flip-flop circuit 22a. When these phases are in agreement, the level of output f becomes High. By this output f, a third gate circuit 13 is blocked and the pulse generator 25 is driven to give a pulse k having a predetermined width of 5 milliseconds so as to drive the capstan motor 8 only during the interval of this pulsewidth so as to stop the tape.

Moreover, the above output f is added to said signal h through a fourth gate circuit 27 which is rendered conductive by a still picture reproduction signal a to give a signal h which is then fed to said flip-flop circuit 22a so that the output of flip-flop circuit 22a is maintained at the High level.

Compared with the earlier-mentioned embodiment, this embodiment is simpler in construction, for it is sufficient that the pulse generator 25a prepares a pulse having a given width.

As described hereinbefore, the rotary head type magnetic video recorder/reproducer device according to this invention repeatedly reproduces a picture signal of one field during still picture reproduction from a magnetic tape carrying records in recording foci such that foci of different magnetization directions are alternating to thereby automatically provide a high-quality field still picture.

We claim:

1. A rotary head type magnetic recording and reproducing apparatus for recording and reproducing a video signal sequentially on a magnetic tape driven by a capstan by alternately using two rotary heads provided on a rotating body, said two heads having head gap angles which are slightly different from each other and which carry out azimuth recording such that each field of a frequency modulated video signal is reproduced by following a record locus which is oblique to the length of the magnetic tape, said apparatus comprising:
   (a) a means for driving said magnetic tape at a speed which is lower than the tape speed used in a recording mode when said apparatus is reproducing still pictures;
   (b) at least one additional rotary magnetic head for reproducing still pictures, provided on said rotating body, and having a head gap angle which is the same as that of one of said two rotary magnetic heads, said apparatus reproducing one recording track repeatedly by using two of said rotary magnetic heads having a same head gap angle when said magnetic tape is moving slowly and stopped;
   (c) a means for detecting a noise generation section within reproduced signals of at least one magnetic head;
   (d) a means for comparing the phase difference between the signal of said means for detecting and a pulse signal synchronized with the rotational phase of said rotating body when an output of said means for detecting occurs within a predetermined rotational phase position of said rotating body;
   (e) a means for stopping the travel of said magnetic tape after driving a specified length of said magnetic tape responding to the output of said means for comparing when said tape is moving slowly by said means for driving.

2. A rotary head type magnetic recording and reproducing apparatus as claimed in claim 1, wherein said means for detecting comprises a comparator for comparing the level of an envelope of said reproduced signal with a predetermined level.

3. A rotary head type magnetic recording and reproducing apparatus as claimed in claim 1, wherein said means for detecting comprises a comparator for comparing the level of a demodulation signal of said reproduced signal with a predetermined level.

4. A rotary head type magnetic recording and reproducing apparatus as claimed in claim 1, wherein said means for detecting comprises a means for detecting the output of a band reject filter by which demodulation signals of said reproduced signals which are outside of a predetermined frequency band remain.

5. A rotary head type magnetic recording and reproducing apparatus as claimed in claim 1, wherein said means for stopping comprises a means for stopping the travel of said magnetic tape after allowing said tape to run a tape length which is in proportion to the output of said means for comparing.

6. A rotary head type magnetic recording and reproducing apparatus as claimed in claim 1, wherein said means for comparing comprises a means of generating a signal output at the time that the output of said means for detecting are synchronized with said pulse signal, and said means for stopping comprises a means for stopping the travel of said magnetic tape after driving a predetermined length of said magnetic tape.

7. A rotary head type magnetic recording and reproducing apparatus as claimed in claim 1, wherein said means for detecting comprises a means for detecting a noise generating section within reproduced signals of the other magnetic head not used to produce said reproducing video signal when said tape is moving slowly, and said means for stopping comprises a means for stopping the travel of said magnetic tape at the time that the output of said means for comparing occurs within a predetermined rotational phase position of said rotating body.

* * * * *